US012684441B2

(12) United States Patent (10) Patent No.: US 12,684,441 B2

Lu et al. (45) Date of Patent: Jul. 14, 2026

(54) NSTR LINK PAIR CHANNEL SWITCHING OPERATION SCHEME

(71) Applicant: MEDIATEK INC., Hsinchu (TW)

(72) Inventors: Kai ying Lu, San Jose, CA (US);
James Chih-Shi Yee, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 351 days.

(21) Appl. No.: 18/239,227

(22) Filed: Aug. 29, 2023

(65) Prior Publication Data

US 2024/0080736 A1 Mar. 7, 2024

Related U.S. Application Data

(60) Provisional application No. 63/374,611, filed on Sep. 6, 2022.

(51) Int. Cl.
  *H04W 36/18* (2009.01)
  *H04W 76/19* (2018.01)

(52) U.S. Cl.
  CPC ........... *H04W 36/18* (2013.01); *H04W 76/19* (2018.02)

(58) Field of Classification Search
  CPC ......... H04B 7/02; H04B 7/024; H04W 76/19; H04W 36/0033; H04W 88/08; H04W 36/06; H04W 76/15; H04W 84/12

See application file for complete search history.

(56) References Cited

U.S. PATENT DOCUMENTS

| | | | |
|---|---|---|---|
| 2022/0200749 A1* | 6/2022 | Hald | H04W 52/44 |
| 2023/0164831 A1* | 5/2023 | Kim | H04W 76/15 |
| | | | 370/329 |
| 2023/0262553 A1* | 8/2023 | Lu | H04W 36/06 |
| | | | 370/331 |
| 2023/0319722 A1* | 10/2023 | Wang | H04W 52/0248 |
| | | | 370/311 |

(Continued)

FOREIGN PATENT DOCUMENTS

WO    2021201504 A1    10/2021

OTHER PUBLICATIONS

"802 11 working group of the LAN/MAN standards for information technology" Aug. 2022, pp. 1-194, XP068192255 (Year: 2022).*

(Continued)

*Primary Examiner* — Mewale A Ambaye

(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be an access point (AP) multi-link device (MLD). In certain configurations, the AP MLD establishes a primary link on a first channel and a non-primary link on a second channel. The AP MLD determines to perform a channel switch operation to switch a first link of the primary link and the non-primary link to operating on a different channel. The AP MLD transmits, on the primary link and prior to the switching of the first link, a first management frame including a first element indicating a target switching time for the switching of the first link. The AP MLD transmits, on the primary link after the switching of the first link, a second management frame indicating that an AP on the first link is in operation.

18 Claims, 11 Drawing Sheets

(56) References Cited

U.S. PATENT DOCUMENTS

2024/0080736 A1* 3/2024 Lu .......................... H04W 88/08
2024/0373242 A1* 11/2024 Nayak ................... H04W 16/14

OTHER PUBLICATIONS

European Search Report, Feb. 9, 2024, Germany.
Edward Au et al., IEEE 802.11be CC36 comments, IEEE P802.11
Wireless LANs, IEEE 802.11-21/1018r47, 2022.
European Search Report, Dec. 19, 2024, Germany.
Auet Al: IEEE P802.11 Wireless LANs, IEEE 802.11-21/1018r47,
2022, Edward Au, IEEE 802.11be CC36 comments.
IEEE Draft, vol. 802.11be drafts, No. D2.1.1, Aug. 14, 2022 (Aug.
14, 2022), pp. 1-941, XP068192255.

* cited by examiner

1000

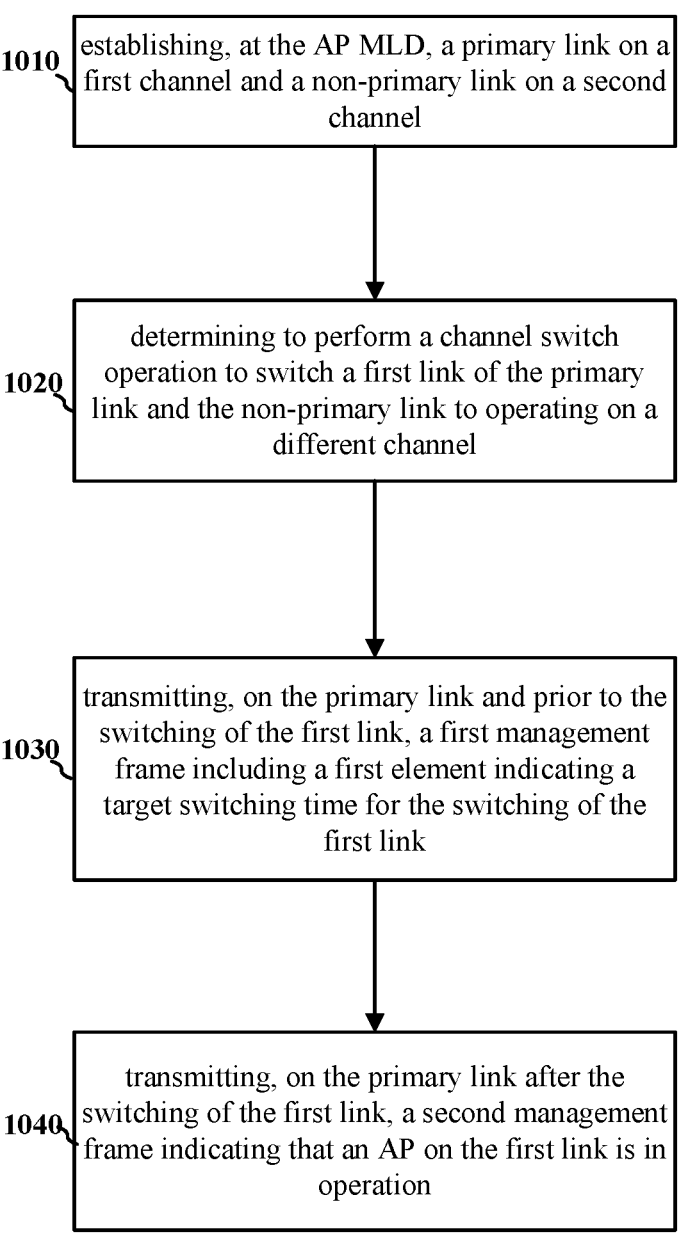

1010 establishing, at the AP MLD, a primary link on a first channel and a non-primary link on a second channel

1020 determining to perform a channel switch operation to switch a first link of the primary link and the non-primary link to operating on a different channel

1030 transmitting, on the primary link and prior to the switching of the first link, a first management frame including a first element indicating a target switching time for the switching of the first link

1040 transmitting, on the primary link after the switching of the first link, a second management frame indicating that an AP on the first link is in operation

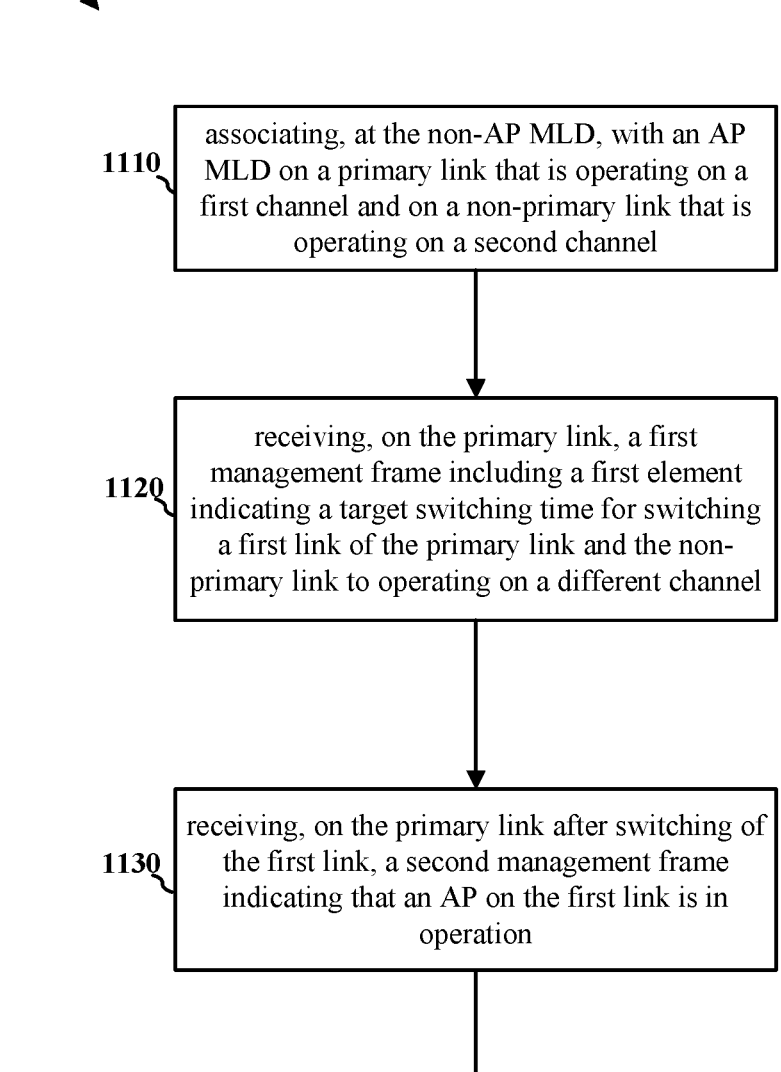

1110 associating, at the non-AP MLD, with an AP MLD on a primary link that is operating on a first channel and on a non-primary link that is operating on a second channel 1120 receiving, on the primary link, a first management frame including a first element indicating a target switching time for switching a first link of the primary link and the non-primary link to operating on a different channel 1130 receiving, on the primary link after switching of the first link, a second management frame indicating that an AP on the first link is in operation 1140 resuming communication on the first link based on the second management frame, where the first link is operating on the different channel

FIG. 11

NSTR LINK PAIR CHANNEL SWITCHING OPERATION SCHEME

CROSS-REFERENCE TO RELATED APPLICATION(S)

This application claims the benefits of U.S. Provisional Application Ser. No. 63/374,611, entitled "NSTR LINK PAIR CHANNEL SWITCH OPERATION SCHEME" and filed on Sep. 6, 2022, which is expressly incorporated by reference herein in their entirety.

BACKGROUND

Field

The present disclosure relates generally to communication systems, and more particularly, to techniques of non-simultaneous transmit and receive (NSTR) link pair channel switch operation scheme.

Background

The statements in this section merely provide background information related to the present disclosure and may not constitute prior art.

In wireless networks such as a wireless local area network (WLAN) operating in accordance with the Institute of Electrical and Electronics Engineers (IEEE) 802.11 standard(s), a multi-link device (MLD) is a device that supports multi-link operation yet is susceptible to in-device coexistence (IDC) interference when two or more of the multiple links are close to each other. The MLD operating on two links with IDC interference cannot support simultaneous transmission and reception on the two links, which are referred to as a non-simultaneous-transmit-and-receive (NSTR) pair of links. In such cases, the MLD is referred to as an NSTR MLD.

An access point (AP) MLD that has IDC interference and operates on an NSTR pair of links is referred to as an NSTR AP MLD. For an NSTR AP MLD, synchronous transmission between the NSTR AP MLD and an STR/NSTR non-AP MLD can be applied to avoid the IDC interference by performing contention based channel access on the NSTR pair of links respectively and start transmission at the same time with the following constraints. Firstly, the NSTR AP MLD may designate one link of an NSTR link pair as a primary link, with the other link of the NSTR link pair being a non-primary link or a secondary link. In this case, the NSTR AP MLD may transmit Beacon frames and Probe Response frames on the primary link but not on the non-primary link. Further, the non-primary link may initiate a physical layer protocol data unit (PPDU) transmission only if a station (STA) affiliated with the same MLD in the primary link is also initiating the PPDU as a TXOP holder with the same start time.

However, when channel switch operation is required for one or both of the primary link and the non-primary link of the NSTR link pair, there are challenges as a result of the constraints. For example, since there is no Beacon frames and Probe Response frames transmitted on the non-primary link, the non-AP MLD may have difficulties knowing when the AP on the non-primary link resumes the basic service set (BSS) operation on the new channel. Further, when both the primary link and the non-primary link are needed to switch from the current operating channels to either another new operating channels together or swap the operating channel with each other, there is a need to efficiently designate a new primary link and non-primary link or perform the channel switching. Moreover, the associated non-AP MLD also needs a way to efficiently perform primary link and non-primary link channel switching.

Therefore, there is a need for a solution of the NSTR link pair channel switch operation scheme in wireless communications to address aforementioned issues.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an access point (AP) multi-link device (MLD). In certain configurations, the AP MLD establishes a primary link on a first channel and a non-primary link on a second channel. The AP MLD determines to perform a channel switch operation to switch a first link of the primary link and the non-primary link to operating on a different channel. The AP MLD transmits, on the primary link and prior to the switching of the first link, a first management frame including a first element indicating a target switching time for the switching of the first link. The AP MLD transmits, on the primary link after the switching of the first link, a second management frame indicating that an AP on the first link is in operation.

In another aspect of the disclosure, a method, a computer-readable medium, and an apparatus are provided. The apparatus may be a non-AP MLD. In certain configurations, the non-AP MLD associates, at the non-AP MLD, with an AP MLD on a primary link that is operating on a first channel and on a non-primary link that is operating on a second channel. The non-AP MLD receives, on the primary link, a first management frame including a first element indicating a target switching time for switching a first link of the primary link and the non-primary link to operating on a different channel. The non-AP MLD receives, on the primary link after switching of the first link, a second management frame indicating that an AP on the first link is in operation. The non-AP MLD resumes communication on the first link based on the second management frame, where the first link is operating on the different channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a flow chart 1000 of a method (process) of wireless communication of an AP MLD.

FIG. 11 is a flow chart 1100 of a method (process) of wireless communication of a non-AP MLD.

DETAILED DESCRIPTION

Figure 1:
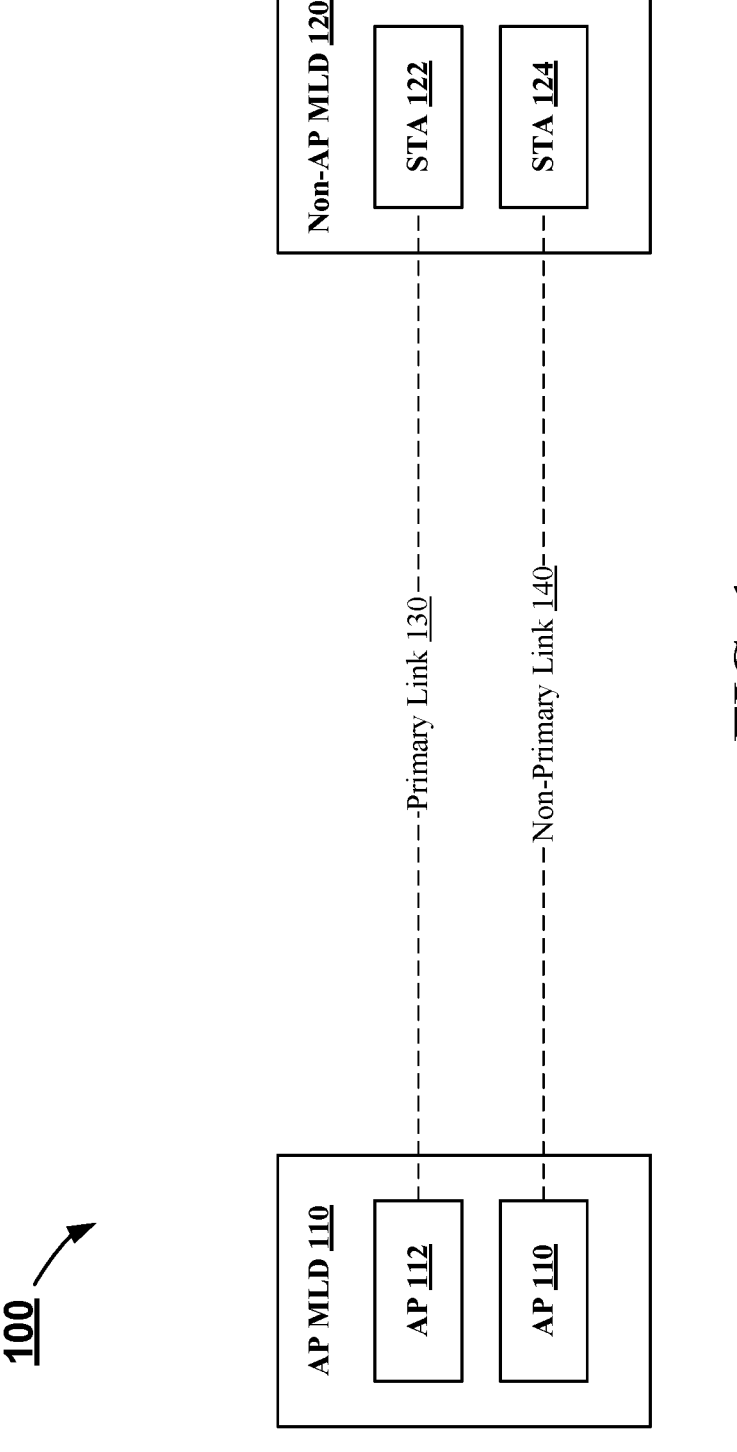
FIG. 1 is a diagram illustrating an exemplary network environment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an exemplary network environment 100. The network environment 100 may involve at least a NSTR AP MLD 110 and a non-AP MLD 120 communicating wirelessly with each other in accordance with the IEEE 802.11 standards. The NSTR AP MLD 110 has a first AP 112 and a second AP 114, and each of the APs 112 and 114 may be an AP station (STA) affiliated with the NSTR AP MLD 110. The non-AP MLD 120 has a first STA 122 and a second STA 124, and each of the STAs 122 and 124 may be a non-AP STA affiliated with the non-AP MLD 120. Further, the NSTR AP MLD designates a link pair between the NSTR AP MLD 110 and the non-AP MLD 120. Specifically, the AP 112 and the STA 122 are communicate with each other on a primary link 130 on a corresponding first channel, and the AP 114 and the STA 124 communicate with each other on a non-primary link 140 on a corresponding second channel.

In certain embodiments of the present disclosure, under a scheme with respect to the NSTR link pair channel switch operation, the NSTR AP MLD 110 may schedule a channel switch operation for the primary link 130 and/or the non-primary link 140 by including information related to a target switching time (which indicates the time of the non-primary link 140 being switched to a new channel or suspended) and an estimated channel switch time that the AP 114 operating on the non-primary link 140 resumes a basic service set (BSS) operation on the new channel in a management frame, such as a Beacon frame or a Probe Response frame, that the AP 112 affiliated with the NSTR AP MLD 110 and operating on the primary link 130, such that the AP 114 affiliated with the NSTR AP MLD 110 on the non-primary link 140 may suspend and resume the BSS operation based on the information carried in the management frame (i.e., the Beacon frame or the Probe Response frame) on the primary link 130.

In certain configurations, the Beacon frame or the Probe Response frame may include a channel switch announcement element or an extended channel switch announcement element indicating the target switching time of the non-primary link 140 being suspended, and a max channel switch time element indicating the estimated time that the AP 114 operating on the non-primary link 140 resumes the BSS operation after the target switching time. The corresponding elements may be included in a per STA profile sub-element in the multi-link element carried in the Beacon frames or the Probe Response frames on the primary link.

In certain configurations, the per STA profile sub-element of each of the Beacon frames or the Probe Response frames transmitted before the target switching time includes the channel switch announcement element or the extended channel switch announcement element. In other words, the Beacon frames or the Probe Response frames transmitted after the target switching time do not include the channel switch announcement element or the extended channel switch announcement element. In certain configurations, the per STA profile sub-element of each of the Beacon frames or the Probe Response frames transmitted before the AP 114 operating on the non-primary link 140 resumes the BSS operation includes the max channel switch time element. In other words, the Beacon frames or the Probe Response frames transmitted after the AP 114 operating on the non-primary link 140 resumes the BSS operation do not include the max channel switch time element.

Figure 2:
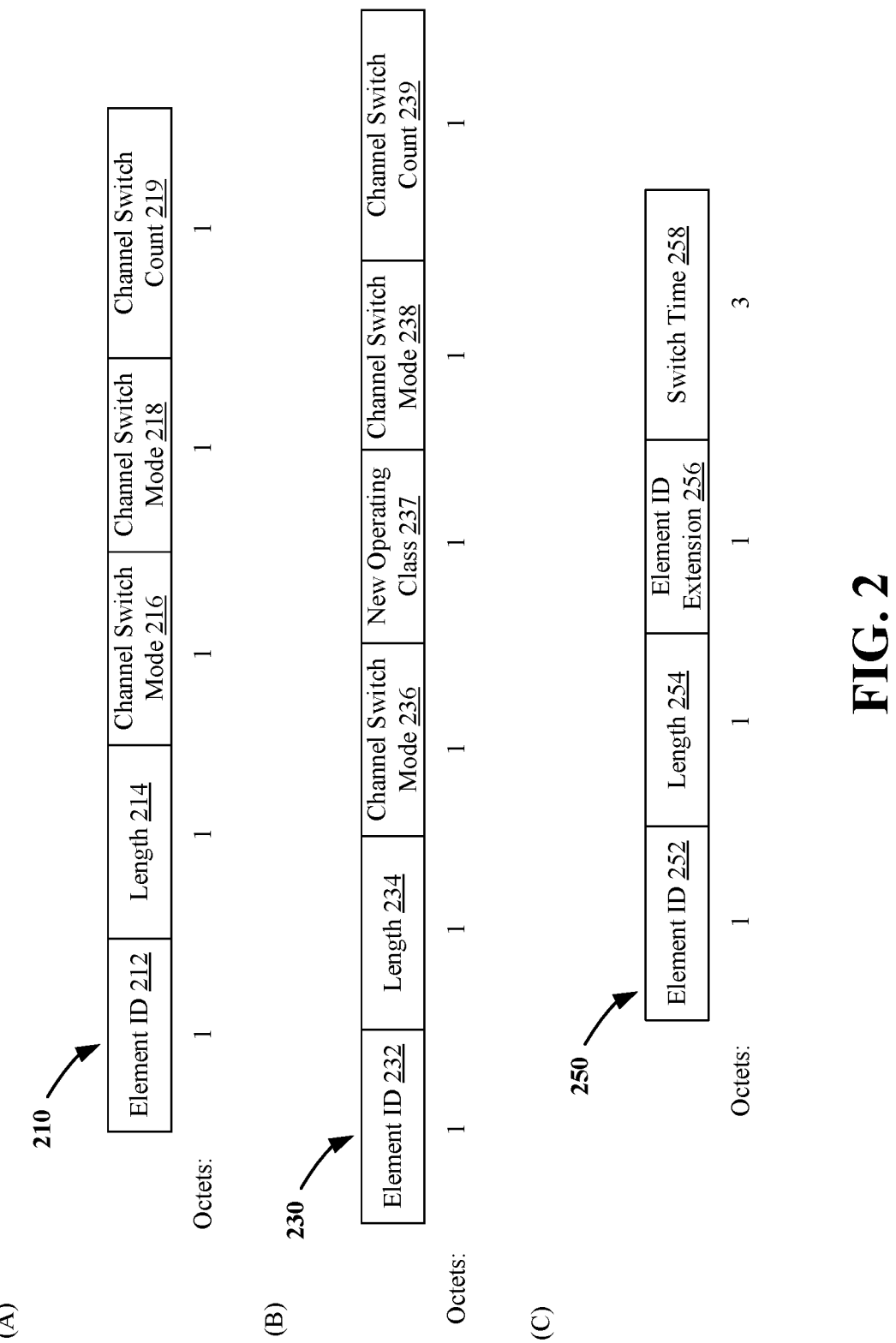
FIG. 2 and FIG. 3 are diagrams illustrating exemplary designs of corresponding elements in a Beacon frame under the scheme.
Figure 3:
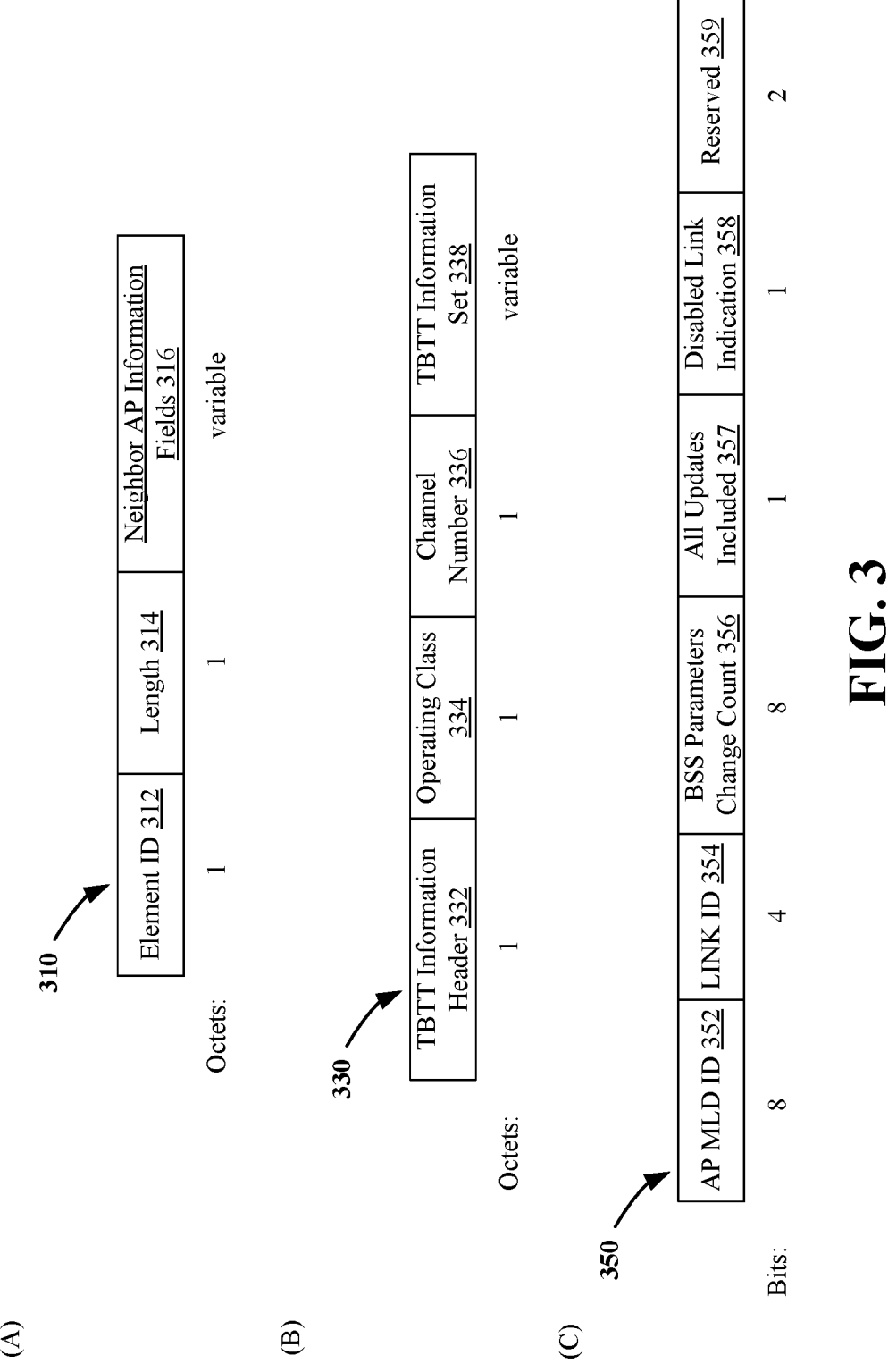

FIG. 2 and FIG. 3 are diagrams illustrating exemplary designs of corresponding elements in a Beacon frame under the scheme. Referring to FIG. 2(A), the channel switch announcement element 210 is used by an AP or STA, such as the AP 112 as shown in FIG. 1, to advertise when the AP 112 operating on the primary link 130 and/or the AP 114 operating on the non-primary link 140 is changing to a new channel and the channel number of the new channel. As shown in FIG. 2(A), the channel switch announcement element 210 includes an element ID field 212, a length field 214, a channel switch mode field 216, a new channel number field 218, and a channel switch count field 219, and each field is a 1-octet field. Specifically, the channel switch announcement element 210 may refer to a primary link channel switching announcement and/or a non-primary link channel switching announcement. Further, the target switching time may be represented in the channel switch count field 219 of the channel switch announcement element 210 in the form of the channel switch count (CSC), which is applied in reference to the most recent target beacon transmission time (TBTT) and the beacon interval (BI) indicated in the corresponding elements of the AP 112 operating on the primary link 130. For example, the channel switch count field 219 is set to the number of TBTTs until the STA (e.g., the AP 112) sending the channel switch announcement element 210 switches to the new channel. In particular, the value of the channel switch count field 219 being 1 indicates that the switch occurs at the next TBTT. In this case, the AP 114 affiliated with the NSTR AP MLD 110 on the non-primary link 140 may suspend the BSS operation at and after the target switch time (i.e., the channel switch count) indicated in the channel switch announcement element 210.

Referring to FIG. 2(B), the extended channel switch announcement element 230 is used by an AP or STA, to advertise when the BSS is changing to a new channel in the same or a new operating class. The extended channel switch announcement element 230 is present only when an extended channel switch is pending. As shown in FIG. 2(B), the extended channel switch announcement element 230 includes an element ID field 232, a length field 234, a channel switch mode field 236, a new operating class field 237, a new channel number field 238, and a channel switch count field 239, and each field is a 1-octet field. Specifically, the extended channel switch announcement element 230 may refer to a primary link channel switching announcement and/or a non-primary link channel switching announcement. Further, the target switching time may be represented in the channel switch count field 239 of the extended channel switch announcement element 230 in the form of the CSC, which is applied in reference to the most recent TBTT and the BI indicated in the corresponding elements of the AP 112 operating on the primary link 130. For example, the channel switch count field 239 is set to the number of TBTTs until the STA (e.g., the AP 112) sending the extended channel switch announcement element 230 switches to the new channel. In particular, the value of the channel switch count field 239 being 1 indicates that the switch occurs at the next TBTT. In this case, the AP 114 affiliated with the NSTR AP MLD 110 on the non-primary link 140 may suspend the BSS operation at and after the target switch time (i.e., the channel switch count) indicated in the extended channel switch announcement element 230.

Referring to FIG. 2(C), the max channel switch time element 250 indicates the estimated time delta between the target switching time (i.e., the time the last Beacon frame carrying the target switching time is transmitted by the AP 112 operating on the primary link 130 in the current channel) and the expected time when the AP 114 on the non-primary link 140 resumes the BSS operation on the new channel after the channel switch operation has occurred (i.e., the expect time of the first Beacon frame not including the max channel switch time element transmitted by the AP 112 on the primary link 130). In certain embodiments, the max channel switch time element 250 is optionally present in a Basic Multi-Link element carried by the Beacon frame when a channel switch announcement element 210 or an extended channel switch announcement element 230 is also present.

As shown in FIG. 2(C), the max channel switch time element 250 includes an element ID field 252, a length field 254, an element ID extension field 256, and a switch time field 258, in which the first three fields are 1-octet fields and the switch time field 258 is a 3-octet field. Specifically, the switch time field 258 indicates an estimated time when the AP 114 on the non-primary link 140 resumes the BSS operation on the new channel after the channel switch operation has occurred. Specifically, the estimated time indicated by the switch time field 258 may be a maximum time delta between the target switching time (i.e., the time the last Beacon frame carrying the target switching time is transmitted by the AP 112 on the primary link 130) and the expected time when the AP 114 on the non-primary link 140 resumes the BSS operation on the new channel after the channel switch operation has occurred (i.e., the expected time of the first Beacon frame not including the max channel switch time element 250 transmitted by the AP 112 on the primary link 130). In certain embodiments, the estimated time that the AP 114 operating on the non-primary link 140 resumes the BSS operation after the target switching time is included in the switch time field 258 in the max channel switch time element 250. In this case, the AP 114 affiliated with the NSTR AP MLD 110 on the non-primary link 140 may resume the suspended BSS operation based on the estimated time indicated in the switch time field 258 of the max channel switch time element 250. In certain embodiments, the estimated time indicated by the switch time field 258 may be a maximum time delta between a time when the Beacon frame carrying the Basic Multi-Link element containing the max channel switch time element is transmitted by the AP 112 operating on the primary link 130 and the expected time when the AP 114 operating on the non-primary link 140 resumes the BSS operation on the new channel after the channel switch has occurred. It should be noted that, while the channel switch count in the channel switch announcement element 210 or the extended channel switch announcement element 230 is applied in reference to the most recent TBTT and the BI on the primary link 130, the switch time field 258 is not tied to the TBTT on the primary link 130, and the estimated time in the switch time field 258 is generally expressed in time units (TUs).

In certain embodiments, in addition to the estimated time indicated in the max channel switch time element, an additional disabled link indication subfield may be used to indicate disablement or enablement of the AP 114 on the non-primary link 140. Specifically, the NSTR AP MLD 110 may indicate the disablement of the non-primary link at and after the target switching time until the reported AP (i.e., the AP 114 on the non-primary link 140) resumes its BSS operation in the TBTT Information field corresponding to the non-primary link 140 in a reduced neighbor report (RNR) element transmitted in the Beacon frames on the primary link 130. In certain embodiments, the RNR element is also included in a per STA profile sub-element in the multi-link element carried in the Beacon frames or the Probe Response frames on the primary link. Referring to FIG. 3(A), the RNR element 310 contains channel and other information related to neighbor APs. As shown in FIG. 3(A), the RNR element 310 includes an element ID field 312, a length field 314, and the neighbor AP information fields 316, in which the first two fields are 1-octet fields, and the neighbor AP information fields 316 contain one or more of the neighbor AP information fields. In other words, the neighbor AP information fields 316 include variable fields.

Referring to FIG. 3(B), in certain embodiments, the neighbor AP information field 330 (which corresponds to the neighbor AP information fields 316) specifies TBTT and other information related to a group of neighbor APs on one channel. As shown in FIG. 3(B), the neighbor AP information field 330 includes a TBTT information header field 332, an operating class field 334, a channel number field 336, and the TBTT information field 338. The TBTT information header field 332 is a 2-octet subfield which identifies the format of the TBTT information field 338. The TBTT information field 338 includes one or more TBTT information fields, namely, a set of subfields. In certain embodiments, the TBTT information header field 332 includes, among other things, a TBTT information field type subfield and a TBTT information length subfield, where the values of the TBTT information field type subfield and the TBTT information length subfield are used to determine the set of subfields in the TBTT information field 338. In one embodiment, the TBTT information field 338 may include a MLD parameters subfield, which is a 3-octet subfield Referring to FIG. 3(C), in certain embodiments, an exemplary MLD parameters subfield 350 includes an 8-bit AP MLD ID subfield 352, a 4-bit link ID subfield 354, an 8-bit BSS parameters change count 356, a 1-bit all updates included subfield 357, a 1-bit disabled link indication subfield 358, and 2 bits reserved. Specifically, the disabled link indication subfield 358 is set to 1 at and after the target switching time to disable the AP on the non-primary link, and to 0 to indicate that the reported AP 114 resumes its BSS operation on the non-primary link 140 (i.e., enabling the AP 114 on the non-primary link 140).

Referring to FIGS. 1-3, in certain embodiments, when the non-AP MLD 120 receives a primary link channel switching announcement in the channel switch announcement element 210 or the extended channel switch announcement element 230 of a Beacon frame, the non-AP MLD 120 shall not transmit any more frames on the non-primary link 140 at and after the target switch time indicated in the timing field (e.g., the channel switch count field 239) until it receives a Beacon frame on the new channel of the primary link 130. In certain embodiments, the non-AP MLD 120 shall not transmit any more frames on the non-primary link 140 at and after the target switch time until it receives a Beacon frame on the new channel of the primary link and the non-primary link is indicated as enabled by the disabled link indication subfield 358 in the RNR element 310.

Referring to FIGS. 1-3, in certain embodiments, when the non-AP MLD 120 receives a non-primary link channel switching announcement in the channel switch announcement element 210 or the extended channel switch announcement element 230 of a Beacon frame, the non-AP MLD 120 shall not transmit any more frames on the non-primary link 140 at and after the target switch time indicated in the timing field until it receives a Beacon frame indicating that the non-primary link resumes the BSS operation by at least one of the following ways. On one hand, the non-primary link 140 is indicated as being enabled on the new channel by the disabled link indication subfield 252 in the RNR element 250 of the most recently received Beacon frame on the primary link 130. On the other hand, in the most recently received Beacon frame transmitted on the primary link 130, the per-STA profile corresponding to the non-primary link 140 stops including the max channel switch time element 250.

Figure 4:
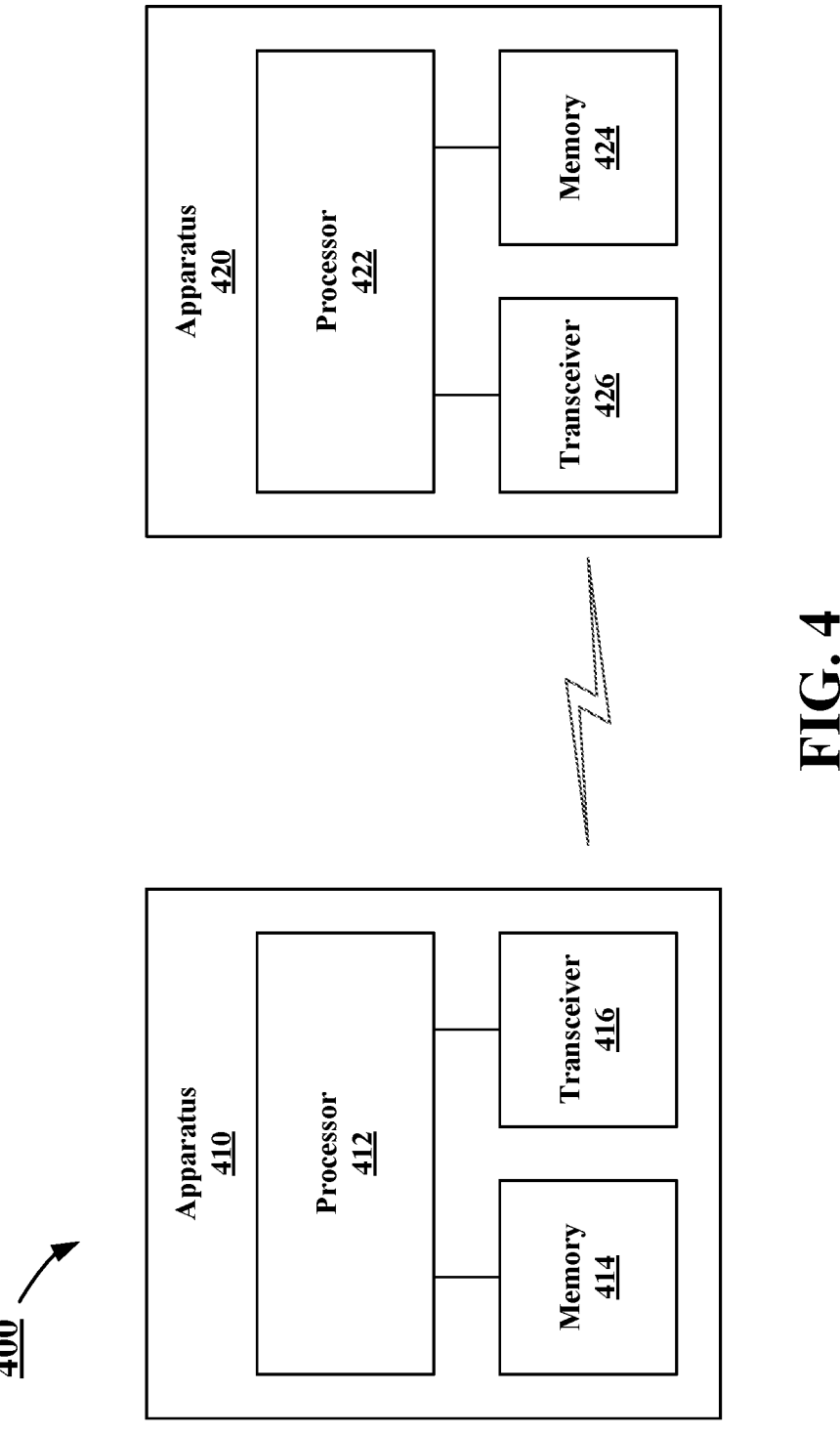
FIG. 4 is a diagram illustrating an exemplary communication system.

FIG. 4 is a diagram illustrating an exemplary communication system 400, which has two apparatuses 410 and 420. Each of the apparatus 410 and the apparatus 420 may perform various functions to implement schemes, techniques, processes and methods described herein pertaining to the channel switch operation, including the scheme described above with respect to various proposed designs, concepts, schemes, systems and methods described above as well as processes described below. For instance, the apparatus 410 may be implemented in the NSTR AP MLD 110 as shown in FIG. 1 and the apparatus 420 may be implemented in the non-AP MLD 120 as shown in FIG. 1.

Each of the apparatus 410 and the apparatus 420 may be a part of an electronic apparatus, which may be a non-AP MLD or an AP MLD, such as a portable or mobile apparatus, a wearable apparatus, a wireless communication apparatus or a computing apparatus. When implemented in a non-AP MLD, each of the apparatus 410 and the apparatus 420 may be implemented in a smartphone, a smart watch, a personal digital assistant, a digital camera, or a computing equipment such as a tablet computer, a laptop computer or a notebook computer. Each of the apparatus 410 and the apparatus 420 may also be a part of a machine type apparatus, which may be an Internet of things (IoT) apparatus such as an immobile or a stationary apparatus, a home apparatus, a wire communication apparatus or a computing apparatus. For instance, each of the apparatus 410 and the apparatus 420 may be implemented in a smart thermostat, a smart fridge, a smart door lock, a wireless speaker or a home control center. When implemented in or as a network apparatus, the apparatus 410 and/or the apparatus 420 may be implemented in a network node, such as an AP MLD in a WLAN.

In certain embodiments, each of the apparatus 410 and the apparatus 420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the scheme described above, each of the apparatus 410 and the apparatus 420 may be implemented in or as a non-AP MLD or an AP MLD. Each of the apparatus 410 and the apparatus 420 may include at least some of those components shown in FIG. 4, such as a processor 412 and a processor 422, respectively, for example. Each of the apparatus 410 and the apparatus 420 may further include one or more other components not pertinent to the proposed scheme of the present disclosure (e.g., internal power supply, display device and/or user interface device), and, thus, such component(s) of the apparatus 410 and the apparatus 420 are neither shown in FIG. 4 nor described below in the interest of simplicity and brevity.

In certain embodiments, the processor 412 and the processor 422 may be implemented in the form of one or more single-core processors, one or more multi-core processors, one or more RISC processors or one or more CISC processors. That is, even though a singular term "a processor" is used herein to refer to the processor 412 and the processor 422, the processor 412 and the processor 422 may include multiple processors in some implementations and a single processor in other implementations in accordance with the present disclosure. In certain embodiments, the processor 412 and the processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in certain embodiments, the processor 412 and the processor 422 is a special-purpose machine specifically designed, arranged and configured to perform specific tasks including those pertaining to system parameters transmission scheme in wireless communications in accordance with various implementations of the present disclosure.

In certain embodiments, the apparatus 410 may further include a memory 414 coupled to the processor 412 and capable of being accessed by the processor 412 and storing data therein. In some implementations, the apparatus 420 may further include a memory 424 coupled to the processor 422 and capable of being accessed by the processor 422 and storing data therein. Each of the memory 414 and the memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of the memory 414 and the memory 424 may include a type of read-only memory (ROM) such as mask ROM, programmable ROM (PROM), erasable programmable ROM (EPROM) and/or electrically erasable programmable ROM (EEPROM). Alternatively, or additionally, each of the memory 414 and the memory 424 may include a type of non-volatile random-access memory (NVRAM) such as flash memory, solid-state memory, ferroelectric RAM (Fe-RAM), magnetoresistive RAM (MRAM) and/or phase-change memory.

In certain embodiments, the apparatus 410 may also include a transceiver 416 coupled to the processor 412. The transceiver 416 may include a transmitter capable of wirelessly transmitting and a receiver capable of wirelessly receiving data. In certain embodiments, the apparatus 420 may also include a transceiver 426 coupled to the processor 422. The transceiver 426 may include a transmitter capable of wirelessly transmitting and a receiver capable of wirelessly receiving data.

Each of the apparatus 410 and the apparatus 420 may be a communication entity capable of communicating with each other using various proposed schemes in accordance with the present disclosure. In certain embodiments, the apparatus 410 may function as the NSTR AP MLD 110, and the apparatus the 420 may function as the non-AP MLD 120 to perform the methods, processes and schemes as described.

Figure 5:
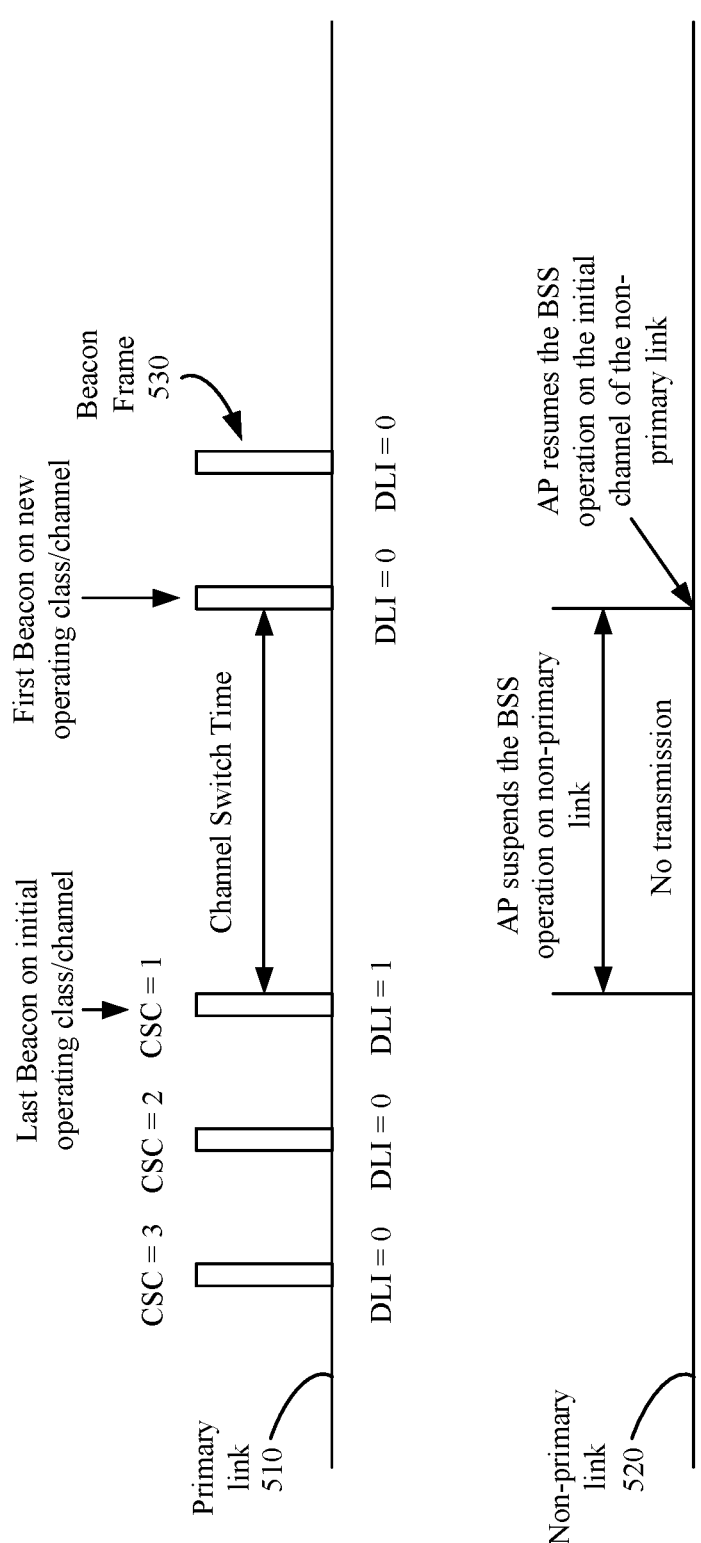
FIG. 5 is a diagram illustrating a first example of an NSTR AP MLD scheduling operating channel switch for the primary link and no change to the non-primary link.

FIG. 5 is a diagram illustrating a first example of an NSTR AP MLD scheduling operating channel switch only for the primary link 510 and no change to the non-primary link 520. Specifically, the AP operating on the primary link 510 transmits a plurality of Beacon frames 530, which may include the channel switch announcement element 210 or the extended channel switch announcement element 230, the max channel switch time element 250, and the RNR element 310. The corresponding elements are carried in the Beacon frames 530 on the primary link 510, and may be included in the per STA profile sub-element in the multi-link element carried in the Beacon frames 530 on the primary link 510. In certain embodiments, instead of the Beacon frames 530, the frames carrying the elements may be the Probe Response frames.

As shown in FIG. 5, the channel switch announcement element 210 or the extended channel switch announcement element 230 indicates the target switching time, which may be represented in the timing field (e.g., the channel switch count field 219 or 239) in the form of the channel switch count (CSC). The CSC is applied in reference to the most recent TBTT and the BI indicated in the corresponding elements of the AP operating on the primary link, and the AP affiliated with the NSTR AP MLD on the non-primary link 520 may determine whether the BSS operation on the initial channel should be suspended based on the CSC value. When the CSC is 1 (indicating the target switching time), the AP affiliated with the NSTR AP MLD on the primary link 510 starts performing the channel switch operation to switch from the initial channel to the new channel, and the AP affiliated with the NSTR AP MLD on the non-primary link 520 shall suspend the BSS operation on the initial channel at and after the target switch time. In this case, when the primary link 510 performs the channel switch operation, there is no transmission on the non-primary link 520 although there is no channel switch operation on the non-primary link.

The NSTR AP MLD may further include the max channel switch time element 250 in the Beacon frame 530 transmitted on the primary link 510 to indicate the estimated time that the first Beacon frame 530 is transmitted on the new channel of the primary link 510 after the channel switch occurs at the target switch time. In other words, the estimated time that the AP operating on the non-primary link 520 resumes the BSS operation after the target switching time is included in the switch time field 258 in the max channel switch time element 250. It should be noted that the switch time field 258 in the max channel switch time element 250 carried in the per-STA profile of the AP is not tied to a TBTT on the affected link (i.e., the primary link 510). Instead, the switch time field 258 provides an estimated time that the AP operating on the non-primary link 520 resumes the BSS operation on the new channel (i.e., the estimated time when the first Beacon frame 530 will be transmitted on the new channel of the primary link 510 after the channel switch has occurred). In certain embodiments, when the channel switch operation on the primary link 510 is complete, the AP operating on the new channel starts transmitting the Beacon frames 530 on the primary link 510. In this case, in the first Beacon frame 530 on the new operating class/channel, there is no max channel switch time element 250. In this case, the AP affiliated with the NSTR AP MLD on the non-primary link 520 resumes the BSS operation on the initial channel of the non-primary link 520.

Figure 6:
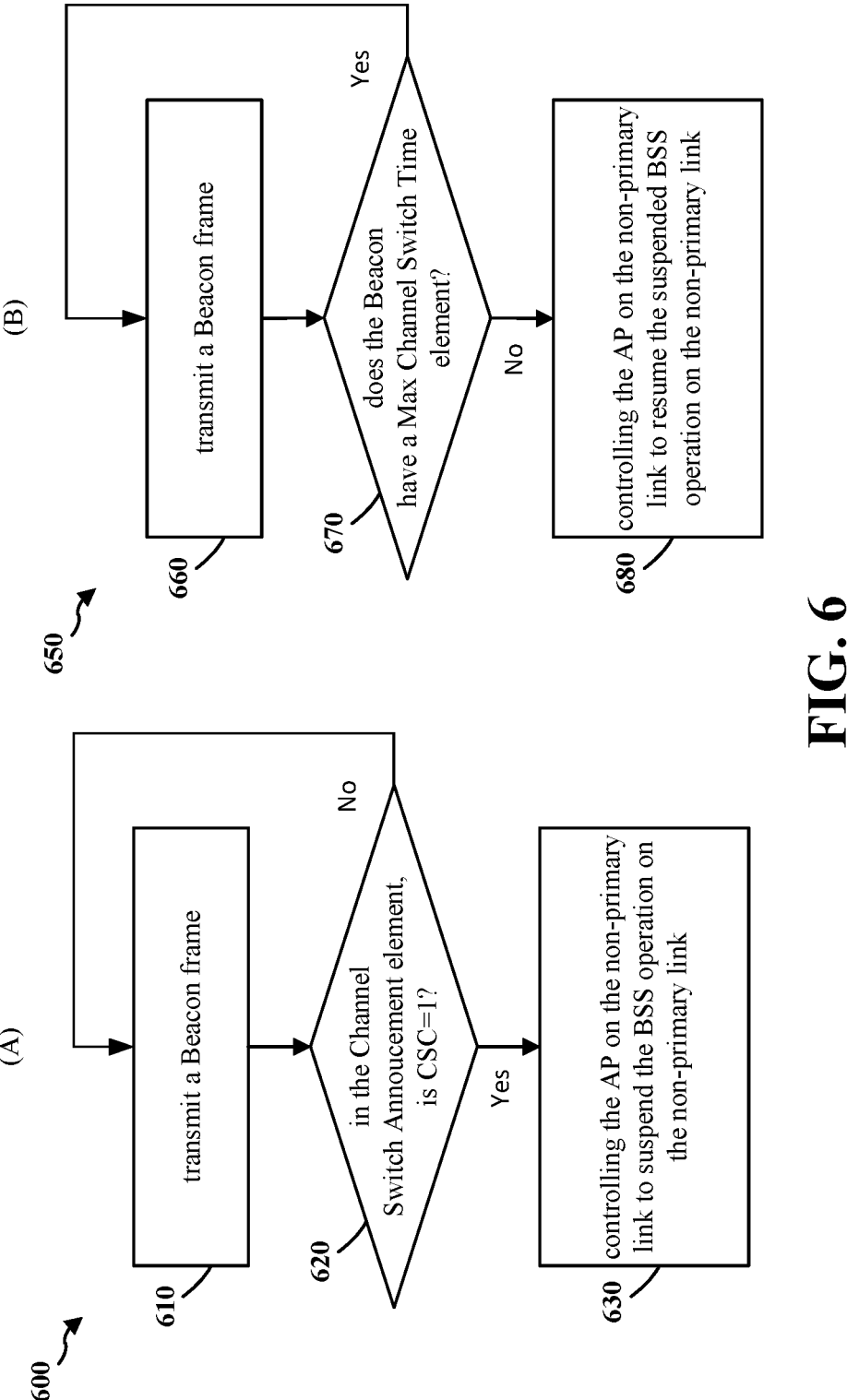
FIG. 6 is a flow chart of methods of suspending and resuming the non-primary link according to the channel switch announcement element, the extended channel switch announcement element and the max channel switch time element.

FIG. 6 is a flow chart of methods of suspending and resuming the non-primary link 520 according to the channel switch announcement element 210, the extended channel switch announcement element 230 and the max channel switch time element 250. As shown in FIG. 6(A), in the method 600, the suspension of the non-primary link 520 is controlled by the timing field (e.g., the channel switch count field 219 or 239) in the channel switch announcement element 210 or the extended channel switch announcement element 230, which indicates the target switching time (e.g., in the form of the CSC). At operation 610, a Beacon frame 530 is transmitted on the primary link 510. At operation 620, it is determined based the value of the timing field (e.g., the channel switch count field 219 or 239) in the channel switch announcement element 210 or the extended channel switch announcement element 230 as to whether the channel switch count is 1 (i.e., whether CSC=1). If CSC is not 1, the non-primary link 520 maintains enabled, and the system returns to operation 610 to wait for a next Beacon frame 530 to be transmitted. If CSC=1, at operation 630, the AP on the non-primary link 520 is controlled to suspend the BSS operation on the non-primary link 520.

As shown in FIG. 6(B), in the method 650, the enablement of the non-primary link 520 is controlled by the switch time field 258 in the max channel switch time element 250, which indicates the estimated time that the AP operating on the non-primary link 520 resumes the BSS operation. At operation 660, a Beacon frame 530 is transmitted on the primary link 510. At operation 670, it is determined whether the Beacon frame 530 includes the max channel switch time element 250. If the Beacon frame 530 includes the max channel switch time element 250, the non-primary link 520 maintains suspended, and the system returns to operation 660 to wait for a next Beacon frame 530 to be transmitted. If the Beacon frame 530 does not include the max channel switch time element 250, at operation 680, the AP on the non-primary link 520 is controlled to resume the BSS operation on the non-primary link 520.

In an alternative embodiment, the RNR element 310 includes the disabled link indication subfield 358 to indicate the disablement or enablement of the AP on the non-primary link 520. Specifically, before the target switch time, the value of the disabled link indication subfield 358 is 0 (i.e., DLI=0) before the last Beacon frame 530 on the initial operating class/channel (in which CSC=1), and in the last Beacon frame 530 on the initial operating channel, the value of the disabled link indication subfield 358 is 1 (i.e., DLI=1), indicating the AP on the non-primary link 520 to suspend/ disable the transmission. Further, when the channel switch operation on the primary link 510 is complete, the AP operating on the new channel starts transmitting the Beacon frames 530 on the primary link 510. In this case, in the first Beacon frame 530 on the new operating class/channel, the value of the disabled link indication subfield 358 is 0 (i.e., DLI=0), indicating the AP on the non-primary link 520 to resume/enable the transmission. In this case, the AP affiliated with the NSTR AP MLD on the non-primary link 520 resumes the suspended BSS operation on the initial channel of the non-primary link 520.

Figure 7:
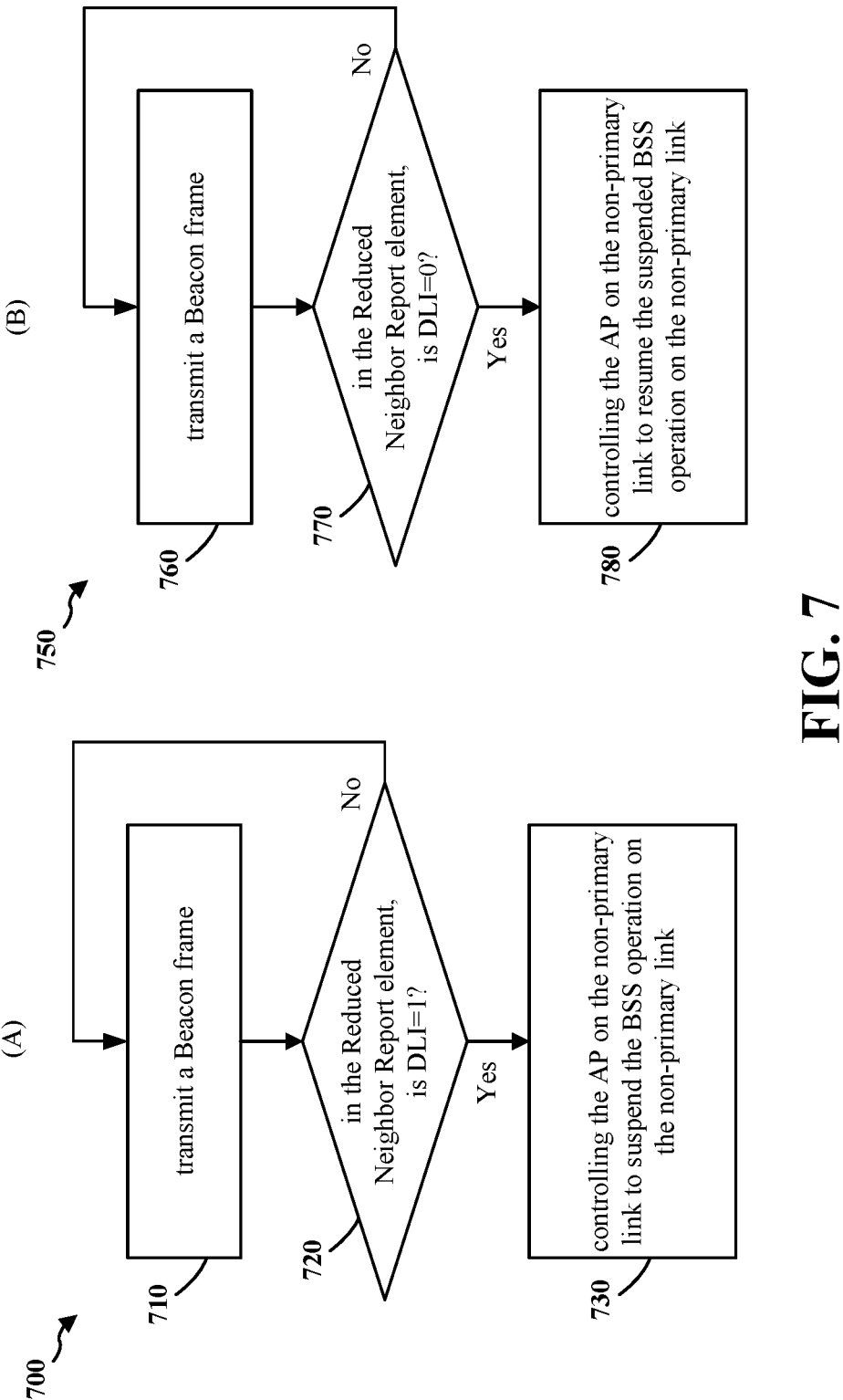
FIG. 7 is a flow chart of methods of suspending and resuming the non-primary link according to the reduced neighbor report element.

FIG. 7 is a flow chart of methods of suspending and resuming the non-primary link according to the reduced neighbor report element 310. As shown in FIG. 6(B), in the method 700, the suspension/disablement of the non-primary link 520 is controlled by the disabled link indication subfield 358 in the reduced neighbor report element 310. At operation 710, a Beacon frame 530 is transmitted on the primary link 510. At operation 720, it is determined based the value of the disabled link indication subfield 358 in the reduced neighbor report element 310 as to whether the disabled link indication is 1 (i.e., whether DLI=1). If DLI=0, the non-primary link 520 maintains enabled, and the system returns to operation 710 to wait for a next Beacon frame 530 to be transmitted. If DLI=1, at operation 730, the AP on the non-primary link 520 is controlled to suspend the BSS operation on the non-primary link 520.

As shown in FIG. 7(B), in the method 750, the enablement of the non-primary link 520 is controlled by the disabled link indication subfield 358 in the reduced neighbor report element 310. At operation 760, a Beacon frame 530 is transmitted on the primary link 510. At operation 770, it is determined based the value of the disabled link indication subfield 358 in the reduced neighbor report element 310 as to whether the disabled link indication is 0 (i.e., whether DLI=0). If DLI=1, the non-primary link 520 maintains suspended/disabled, and the system returns to operation 760 to wait for a next Beacon frame to be transmitted. If DLI=0, at operation 780, the AP on the non-primary link 520 is controlled to resume/enable the BSS operation on the non-primary link 520.

Figure 8:
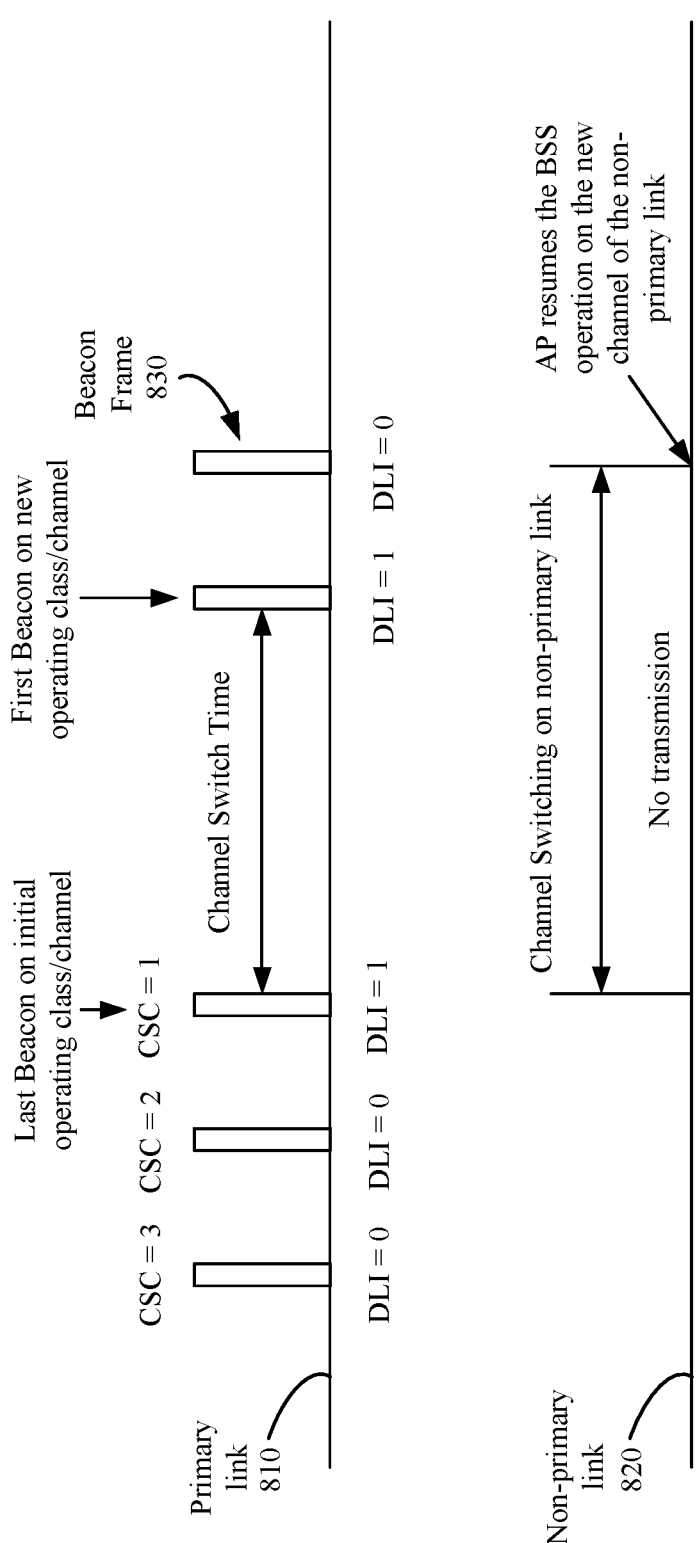
FIG. 8 is a diagram illustrating a second example of an NSTR AP MLD scheduling operating channel switches for both the primary link and the non-primary link.

FIG. 8 is a diagram illustrating a second example of an NSTR AP MLD scheduling operating channel switches for both the primary link 810 and the non-primary link 820. Specifically, in order to change the operating channels of the current NSTR link pair (both the primary link 810 and non-primary link 820) to new operating channels respectively, the NSTR AP MLD shall perform channel switch for the primary link 810 and the non-primary link 820 at the same target switch time. Similar to FIG. 5, the AP operating on the primary link 810 transmits a plurality of Beacon frames 830, which may include the channel switch announcement element 210 or the extended channel switch announcement element 230, the max channel switch time element 250, and the RNR element 310. The corresponding elements are carried in the Beacon frames 830 on the primary link 810, and may be included in the per STA profile sub-element in the multi-link element carried in the Beacon frames 830 on the primary link 810. In certain embodiments, instead of the Beacon frames 830, the frames carrying the elements may be the Probe Response frames.

As shown in FIG. 8, the channel switch announcement element 210 or the extended channel switch announcement element 230 indicates the target switching time, which may be represented in the timing field (e.g., the channel switch count field 219 or 239) in the form of the CSC. The CSC is applied in reference to the most recent TBTT and the BI indicated in the corresponding elements of the AP operating on the primary link 810. As discussed, the NSTR AP MLD that intends to swap the operating channel used for its primary and non-primary links 810 and 820 respectively must simultaneously perform the (extended) channel switch operation on both the links. When the CSC is 1 (indicating the target switching time), both the AP affiliated with the NSTR AP MLD on the primary link 810 and the AP affiliated with the NSTR AP MLD on the non-primary link 820 start performing the respective channel switch operation to switch from the initial channel to the new channel, and the AP affiliated with the NSTR AP MLD on the non-primary link 820 shall suspend the BSS operation on the initial channel at and after the target switch time to start the channel switch operation. In this case, both the primary link 810 and the non-primary link 820 perform the channel switch operations simultaneously. In certain embodiments, the link IDs corresponding to the primary link 810 and the non-primary link 820 after the channel switching keep the same. The suspension of the non-primary link 820 is similar to the suspension of the non-primary link 520 in the method 600 as shown in FIG. 6(A), and is thus not further elaborated herein.

The NSTR AP MLD may include the max channel switch time element 250 in the Beacon frame 830 transmitted on the primary link 810 to indicate the estimated time that the first Beacon frame 830 is transmitted on the new channel of the primary link 810 after the channel switch occurs at the target switch time. The estimated time that the AP operating on the non-primary link 820 resumes the BSS operation after the target switching time is included in the switch time field 258 in the max channel switch time element 250. Specifically, since both the primary link 810 and the non-primary link 820 are intended to perform the channel switch, the Beacon frame 830 transmitted on the primary link 810 may carry two max channel switch time elements 250. For the non-primary link channel switch, the max channel switch time element is included in the Per-STA profile sub-element of the basic multi-link element corresponding to the AP operating on the non-primary link 820 in the Beacon frame 830 transmitted on the primary link 810. It should be noted that the switch time field 258 in the max channel switch time elements 250 for the primary link 810 and non-primary link 820 channel switch may be set to the same value (indicating the estimated time for the channel switch operation being the same on both links) or different values (indicating the estimated time for the channel switch operation being different on the primary link 810 and the non-primary link 820). In certain embodiments, when the channel switch operation on the primary link 810 is complete, the AP operating on the new channel starts transmitting the Beacon frames 830 on the primary link 810. In this case, in one of the subsequent Beacon frames 830 (which is not necessarily the first Beacon frame 830 transmitted by the AP operating on the new channel) on the new operating class/channel on the primary link 810, there is no max channel switch time element 250. In this case, the AP affiliated with the NSTR AP MLD on the non-primary link 820 resumes the suspended BSS operation on the initial channel of the non-primary link 820. The resuming/enablement of the non-primary link 820 is similar to the resuming/enablement of the non-primary link 520 in the method 650 as shown in FIG. 6(B), and is thus not further elaborated herein.

In an alternative embodiment, the RNR element 310 includes the disabled link indication subfield 358 to indicate the disablement or enablement of the AP on the non-primary link 820. Specifically, before the target switch time, the value of the disabled link indication subfield 358 is 0 (i.e., DLI=0) before the last Beacon frame 830 on the initial operating class/channel (in which CSC=1), and in the last Beacon frame 830 on the initial operating channel, the value of the disabled link indication subfield 358 is 1 (i.e., DLI=1), indicating the AP on the non-primary link 820 to suspend/disable the transmission. Further, when the channel switch operation on the primary link 810 is complete, the AP operating resumes its BSS operation on the new channel on the primary link 810, and starts transmitting the Beacon frames 830 on the primary link 810. In this case, in one of the subsequent Beacon frames 830 (which is not necessary the first Beacon frame 830 after the BSS operation on the new channel on the primary link 810 is resumed) on the new operating class/channel on the primary link 810, the value of the disabled link indication subfield 358 is 0 (i.e., DLI=0), indicating the AP on the non-primary link 820 to resume/ enable the transmission. For example, as shown in FIG. 8, in the first Beacon frame 830 on the new operating class/channel of the primary link 810, the DLI remains being 1, indicating the AP on the non-primary link 820 to remain being suspended/disabled; and in the second Beacon frame 830 on the new operating class/channel, the DLI is 0, indicating the AP on the non-primary link 820 to resume/enable the transmission. In this case, the AP affiliated with the NSTR AP MLD on the non-primary link 820 resumes the suspended BSS operation on the initial channel of the non-primary link 820. The suspension/disablement of the non-primary link 820 is similar to the suspension of the non-primary link 520 in the method 700 as shown in FIG. 7(A), and the enablement of the non-primary link 820 is similar to the enablement of the non-primary link 520 in the method 750 as shown in FIG. 7(B). Thus, details of the suspension/disablement and the enablement of the non-primary link 820 are thus not further elaborated herein.

Figure 9:
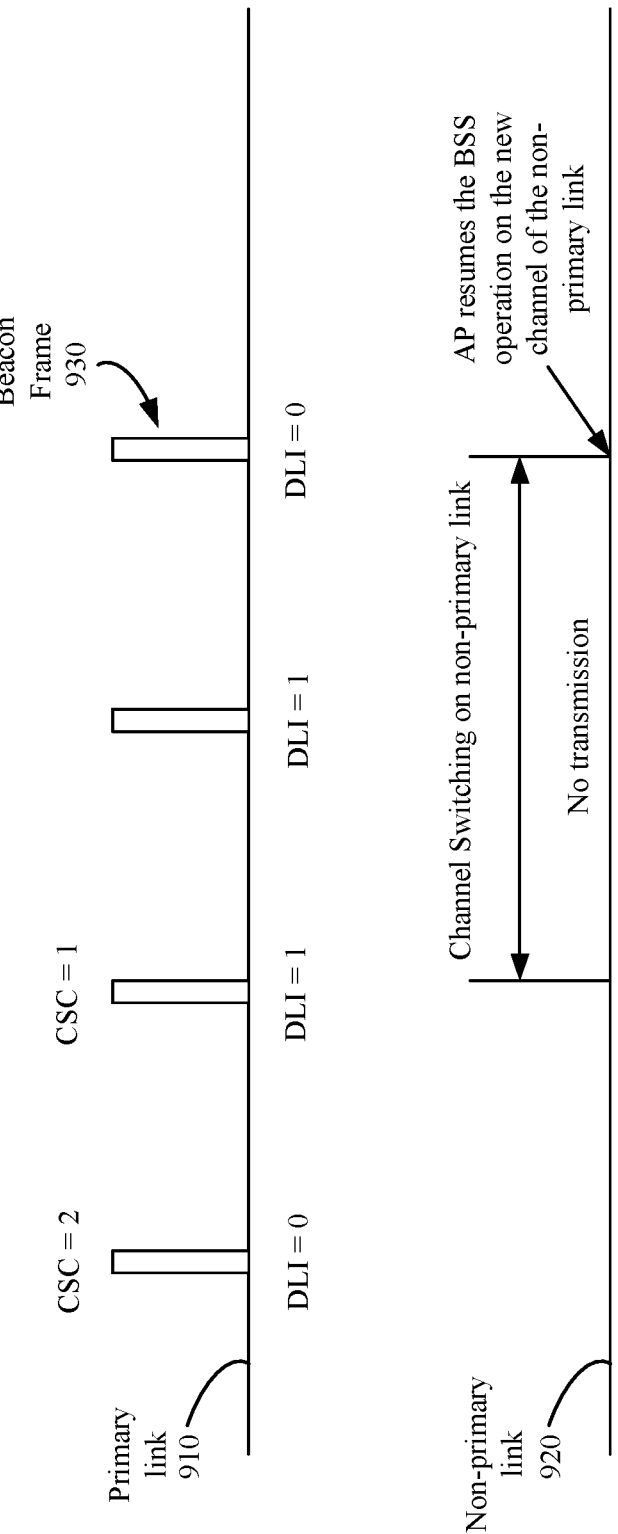
FIG. 9 is a diagram illustrating a third example of an NSTR AP MLD scheduling operating channel switch for the non-primary link and no change to the primary link.

FIG. 9 is a diagram illustrating a third example of an NSTR AP MLD scheduling operating channel switch for the non-primary link 920 and no change to the primary link 910. Specifically, the AP operating on the primary link 910 transmits a plurality of Beacon frames 930, which may include the channel switch announcement element 210 or the extended channel switch announcement element 230, the max channel switch time element 250, and the RNR element 310. The corresponding elements are carried in the Beacon frames 930 on the primary link 910, and may be included in the per STA profile sub-element in the multi-link element carried in the Beacon frames 930 on the primary link 910. In certain embodiments, instead of the Beacon frames 930, the frames carrying the elements may be the Probe Response frames.

As shown in FIG. 9, the channel switch announcement element 210 or the extended channel switch announcement element 230 indicates the target switching time, which may be represented in the timing field (e.g., the channel switch count field 219 or 239) in the form of the CSC. The CSC is applied in reference to the most recent TBTT and the BI indicated in the corresponding elements of the AP operating on the primary link. When the CSC is 1 (indicating the target switching time), the AP affiliated with the NSTR AP MLD on the non-primary link 920 starts performing the channel switch operation to switch from the initial channel to the new channel. Meanwhile, the AP affiliated with the NSTR AP MLD on the primary link 910 remains its the BSS operation on the initial channel at and after the target switch time. In other words, when the non-primary link 920 performs the channel switch operation, the primary link 910 keeps transmitting the Beacon frames 930. The suspension of the non-primary link 920 is similar to the suspension of the non-primary link 520 in the method 600 as shown in FIG. 6(A), and is thus not further elaborated herein.

The NSTR AP MLD may include the max channel switch time element 250 in the Beacon frame 930 transmitted on the primary link 910 to indicate the estimated time the AP on the non-primary link 920 resumes the BSS operation on the new channel after the channel switch occurs. In other words, the estimated time that the AP operating on the non-primary link 920 completes the channel switching and resumes the BSS operation after the target switching time is included in the switch time field 258 in the max channel switch time element 250. It should be noted that the switch time field 258 in the max channel switch time element 250 carried in the per-STA profile of the AP is not tied to a TBTT on the affected link (i.e., the primary link 910). Instead, the switch time field 258 provides an estimated time in TUs. In certain embodiments, when the channel switch operation on the non-primary link 920 is complete, the AP operating on the primary link 910 transmits a Beacon frame 930 without the max channel switch time element 250. In this case, the AP affiliated with the NSTR AP MLD on the non-primary link 920 resumes the suspended BSS operation on the new channel of the non-primary link 920. The resuming/enablement of the non-primary link 920 is similar to the resuming/enablement of the non-primary link 520 in the method 650 as shown in FIG. 6(B), and is thus not further elaborated herein.

In an alternative embodiment, the RNR element 310 includes the disabled link indication subfield 358 to indicate the disablement or enablement of the AP on the non-primary link 920. Specifically, before the target switch time, the value of the disabled link indication subfield 358 is 0 (i.e., DLI=0) before the last Beacon frame 930 on the initial operating class/channel (in which CSC=1), and in the last Beacon frame 930 on the initial operating channel, the value of the disabled link indication subfield 358 is 1 (i.e., DLI=1), indicating the AP on the non-primary link 920 to suspend/disable the transmission and starts the channel switch operation. Further, when the channel switch operation on the non-primary link 920 is complete, the AP operating on the primary link 910 transmits a Beacon frame 930 with the value of the disabled link indication subfield 358 being 0 (i.e., DLI=0), indicating the AP on the non-primary link 920 to resume the BSS operation. In this case, the AP affiliated with the NSTR AP MLD on the non-primary link 920 resumes the suspended BSS operation on the new channel of the non-primary link 920. The suspension/disablement of the non-primary link 920 is similar to the suspension of the non-primary link 520 in the method 700 as shown in FIG. 7(A), and the enablement of the non-primary link 920 is similar to the enablement of the non-primary link 520 in the method 750 as shown in FIG. 7(B). Thus, details of the suspension/disablement and the enablement of the non-primary link 820 are thus not further elaborated herein.

FIG. 10 is a flow chart 1000 of a method (process) of wireless communication of an AP MLD. The method may be performed by the AP MLD, e.g., the NSTR AP MLD 110 or the apparatus 410. At operation 1010, the AP MLD establishes, at the AP MLD, a primary link on a first channel and a non-primary link on a second channel. At operation 1020, the AP MLD determines to perform a channel switch operation to switch a first link of the primary link and the non-primary link to operating on a different channel. At operation 1030, the AP MLD transmits, on the primary link and prior to the switching of the first link, a first management frame (e.g., a Beacon frame or a Probe Response frame) including a first element (e.g., a channel switch announcement element or an extended channel switch announcement element) indicating a target switching time for the switching of the first link. At operation 1040, the AP MLD transmits, on the primary link after the switching of the first link, a second management frame (e.g., a Beacon frame or a Probe Response frame) indicating that an AP on the first link is in operation.

In certain configurations, the first link is the non-primary link, and the second management frame further includes a second element (e.g., a RNR element) indicating that the non-primary link is resumed.

In certain configurations, the indication of the second management frame is by an absence of indication, in the second management frame, of an estimated time for the AP on the non-primary link to resume operation after the switching of the first link.

In certain configurations, the first link is the non-primary link, and the first management frame further includes a second element (e.g., a max channel switch time element) indicating an estimated time for the AP on the non-primary link to resume operation after the switching of the non-primary link.

In certain configurations, the estimated time is a maximum time difference (a) between the target switching time and an expected time when the AP on the non-primary link resumes operation after the switching of the non-primary link or (b) between the time the first management frame is transmitted on the primary link and an expected time when the AP operating on the non-primary link resumes operation after the switching of the non-primary link.

In certain configurations, the AP MLD switches the non-primary link to operating on the different channel at the target switching time. The AP MLD resumes, by the AP on the non-primary link, operation on the non-primary link after the switching of the non-primary link to operating on the different channel.

In certain configurations, the first link is the primary link. The AP MLD switches the primary link to operating on the different channel at the target switching time. The AP MLD suspends communication on the non-primary link from the target switching time until transmitting the second management frame.

In certain configurations, the first link is the primary link. The AP MLD switches the primary link to operating on the second channel at the target switching time. The AP MLD determines to switch the non-primary link to operating on the first channel, where the first management frame further includes a second element (e.g., a channel switch announcement element or an extended channel switch announcement element) indicating the same target switching time as the primary link for the switching of the non-primary link to operating on the first channel. The AP MLD switches the non-primary link to operating on the first channel at the target switching time.

In certain configurations, the first management frame further includes a third element (e.g., a max channel switch time element) indicating a first estimated time for an AP on the primary link to resume operation after the switching of the primary link and a fourth element (e.g., a max channel switch time element) indicating a second estimated time for an AP on the non-primary link to resume operation after the switching of the non-primary link.

In certain configurations, the second management frame is a first frame (e.g., a Beacon frame or a Probe Response frame) transmitted on the primary link after the switching of the primary link, and the second management frame further indicates that an AP on the non-primary link is in operation.

FIG. 11 is a flow chart 1100 of a method (process) of wireless communication of a non-AP MLD. The method may be performed by a non-AP MLD, e.g., the non-AP MLD 120 or the apparatus 420. At operation 1110, the non-AP MLD associates, at the non-AP MLD, with an AP MLD on a primary link that is operating on a first channel and on a non-primary link that is operating on a second channel. At operation 1120, the non-AP MLD receives, on the primary link, a first management frame (e.g., a Beacon frame or a Probe Response frame) including a first element (e.g., a channel switch announcement element or an extended channel switch announcement element) indicating a target switching time for switching a first link of the primary link and the non-primary link to operating on a different channel. At operation 1130, the non-AP MLD receives, on the primary link after switching of the first link, a second management frame (e.g., a Beacon frame or a Probe Response frame) indicating that an AP on the first link is in operation. At operation 1140, the non-AP MLD resumes communication on the first link based on the second management frame, where the first link is operating on the different channel.

In certain configurations, the first link is the non-primary link, and the second management frame includes a second element (e.g., a RNR element) indicating that the non-primary link is resumed, and the resuming communication is further based on the second element.

In certain configurations, the first link is the non-primary link. The non-AP MLD identifies, from the first management frame, a second element (e.g., a max channel switch time element) indicating an estimated time for the AP on the non-primary link to resume operation after the switching of the non-primary link, and the communication on the first link is resumed after the estimated time.

In certain configurations, the estimated time is a maximum time difference (a) between the target switching time and an expected time when the AP on the non-primary link resumes operation after the switching of the non-primary link or (b) between the time the first management frame is transmitted on the primary link and an expected time when the AP operating on the non-primary link resumes operation after the switching of the non-primary link.

In certain configurations, the non-AP MLD suspends communication on the non-primary link at the target switching time, where the second management frame is received after the estimated time on the primary link. The non-AP MLD resumes communication on the non-primary link after receiving the second management frame.

In certain configurations, the indication of the second management frame is by an absence of indication, in the second management frame, of an estimated time for the AP on the non-primary link to resume operation after the switching of the first link.

In certain configurations, the first link is the primary link. The non-AP MLD suspends communication on the non-primary link from the target switching time until receiving the second management frame indicating the primary link is operational.

In certain configurations, the first link is the primary link and the different channel is the second channel. The non-AP MLD identifies, from the first management frame, a second element (e.g., a channel switch announcement element or an extended channel switch announcement element) indicating the target switching time for switching the non-primary link to operating on the first channel. The non-AP MLD resumes communication on the non-primary link after receiving the second management frame, where the non-primary link is operating on the first channel.

In certain configurations, the non-AP MLD identifies in the first management frame a third element (e.g., a max channel switch time element) indicating a first estimated time for an AP on the primary link to resume operation after the switching of the primary link, where the communication on the primary link is resumed after the first estimated time. The non-AP MLD identifies in the first management frame a fourth element (e.g., a max channel switch time element) indicating a second estimated time for an AP on the non-primary link to resume operation after the switching of the non-primary link, where the communication on the non-primary link is resumed after the second estimated time.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of an access point (AP) multi-link device (MLD), comprising:
    establishing, at the AP MLD, a primary link on a first channel and a non-primary link on a second channel;
    determining to perform a channel switch operation to switch a first link of the primary link and the non-primary link to operating on a different channel;
    transmitting, on the primary link and prior to the switching of the first link, a first management frame including a first element indicating a target switching time for the switching of the first link; and
    transmitting, on the primary link after the switching of the first link, a second management frame indicating that an AP on the first link is in operation, wherein the indication of the second management frame is by an absence of indication, in the second management frame, of an estimated time for the AP on the non-primary link to resume operation after the switching of the first link.

2. The method of claim 1, wherein the first link is the non-primary link, and wherein the second management frame further includes a second element indicating that the non-primary link is resumed.

3. The method of claim 1, wherein the first link is the non-primary link, wherein the first management frame further includes a second element indicating an estimated time for the AP on the non-primary link to resume operation after the switching of the non-primary link.

4. The method of claim 3, wherein the estimated time is a maximum time difference (a) between the target switching time and an expected time when the AP on the non-primary link resumes operation after the switching of the non-primary link or (b) between the time the first management frame is transmitted on the primary link and an expected time when the AP operating on the non-primary link resumes operation after the switching of the non-primary link.

5. The method of claim 3, further comprising:
switching the non-primary link to operating on the different channel at the target switching time; and
resuming, by the AP on the non-primary link, operation on the non-primary link after the switching of the non-primary link to operating on the different channel.

6. The method of claim 1, wherein the first link is the primary link, the method further comprising:
switching the primary link to operating on the different channel at the target switching time; and
suspending communication on the non-primary link from the target switching time until transmitting the second management frame.

7. The method of claim 1, wherein the first link is the primary link, the method further comprising:
switching the primary link to operating on the second channel at the target switching time; and
determining to switch the non-primary link to operating on the first channel, wherein the first management frame further includes a second element indicating the same target switching time as the primary link for the switching of the non-primary link to operating on the first channel; and
switching the non-primary link to operating on the first channel at the target switching time.

8. The method of claim 7, wherein the first management frame further includes a third element indicating a first estimated time for an AP on the primary link to resume operation after the switching of the primary link and a fourth element indicating a second estimated time for an AP on the non-primary link to resume operation after the switching of the non-primary link.

9. The method of claim 7, wherein the second management frame is a first frame transmitted on the primary link after the switching of the primary link, and wherein the second management frame further indicates that an AP on the non-primary link is in operation.

10. A method of wireless communication of a non-access point (AP) multi-link device (MLD), comprising:
associating, at the non-AP MLD, with an AP MLD on a primary link that is operating on a first channel and on a non-primary link that is operating on a second channel;
receiving, on the primary link, a first management frame including a first element indicating a target switching time for switching a first link of the primary link and the non-primary link to operating on a different channel;
receiving, on the primary link after switching of the first link, a second management frame indicating that an AP on the first link is in operation; and
resuming communication on the first link based on the second management frame, wherein the first link is operating on the different channel, wherein the indication of the second management frame is by an absence of indication, in the second management frame, of an estimated time for the AP on the non-primary link to resume operation after the switching of the first link.

11. The method of claim 10, wherein the first link is the non-primary link, and wherein the second management frame includes a second element indicating that the non-primary link is resumed, and wherein the resuming communication is further based on the second element.

12. The method of claim 10, wherein the first link is the non-primary link, the method further comprising:
identifying, from the first management frame, a second element indicating an estimated time for the AP on the non-primary link to resume operation after the switching of the non-primary link, wherein the communication on the first link is resumed after the estimated time.

13. The method of claim 12, wherein the estimated time is a maximum time difference (a) between the target switching time and an expected time when the AP on the non-primary link resumes operation after the switching of the non-primary link or (b) between the time the first management frame is transmitted on the primary link and an expected time when the AP operating on the non-primary link resumes operation after the switching of the non-primary link.

14. The method of claim 12, further comprising:
suspending communication on the non-primary link at the target switching time, wherein the second management frame is received after the estimated time on the primary link; and
resuming communication on the non-primary link after receiving the second management frame.

15. The method of claim 10, wherein the first link is the primary link, the method further comprising:
suspending communication on the non-primary link from the target switching time until receiving the second management frame indicating the primary link is operational.

16. The method of claim 10, wherein the first link is the primary link and the different channel is the second channel, the method further comprising:
identifying, from the first management frame, a second element indicating the target switching time for switching the non-primary link to operating on the first channel; and
resuming communication on the non-primary link after receiving the second management frame, wherein the non-primary link is operating on the first channel.

17. The method of claim 16, further comprising:
identifying in the first management frame a third element indicating a first estimated time for an AP on the primary link to resume operation after the switching of the primary link, wherein the communication on the primary link is resumed after the first estimated time; and
identifying in the first management frame a fourth element indicating a second estimated time for an AP on the non-primary link to resume operation after the switching of the non-primary link, wherein the communication on the non-primary link is resumed after the second estimated time.

18. An apparatus for wireless communication, the apparatus being an access point (AP) multi-link device (MLD), comprising:
a memory; and
at least one processor coupled to the memory, the processor being configured to:
establish a primary link on a first channel and a non-primary link on a second channel;
determine to perform a channel switch operation to switch a first link of the primary link and the non-primary link to operating on a different channel;
transmit, on the primary link and prior to the switching of the first link, a first management frame including a first element indicating a target switching time for the switching of the first link; and transmit, on the primary link after the switching of the first link, a second management frame indicating that an AP on the first link is in operation, wherein the indication of the second management frame is by an absence of indication, in the second management frame, of an estimated time for the AP on the non-primary link to resume operation after the switching of the first link.

\* \* \* \* \*